United States Patent [19]

Perry et al.

[11] Patent Number: 5,307,718
[45] Date of Patent: May 3, 1994

[54] APPARATUS AND PROCESS FOR REMOVING A PREDETERMINED PORTION OF REFLECTIVE MATERIAL FROM MIRROR

[75] Inventors: Stephen J. Perry, San Leandro; Lloyd L. Steinmetz, Livermore, both of Calif.

[73] Assignee: The United States of America as represented by the United States Department of Energy, Washington, D.C.

[21] Appl. No.: 968,569

[22] Filed: Oct. 29, 1992

[51] Int. Cl.$^5$ .............................................. B26D 3/06
[52] U.S. Cl. ............................................ 83/875; 83/56; 83/100; 83/614; 83/564; 144/2 R; 144/114 R
[58] Field of Search ............... 83/861, 879, 880, 56, 83/743, 454, 614, 697, 100, 174, 875, 564; 51/218 P, 221 BS, 211 H; 144/2 R, 114 R, 130; 30/478, 491

[56] References Cited

U.S. PATENT DOCUMENTS

| | | | |
|---|---|---|---|
| 228,686 | 6/1880 | Smith | 83/614 |
| 366,841 | 7/1887 | Johnson, Jr. | 83/875 |
| 1,199,882 | 10/1916 | Frey . | |
| 3,230,475 | 1/1966 | Koester et al. | 331/94.5 |
| 3,282,148 | 11/1966 | Yamada | 88/14 |
| 3,712,166 | 1/1973 | Rossetti | 83/455 |
| 3,779,119 | 12/1973 | Broides | 83/455 |
| 4,040,726 | 8/1977 | Paca | 350/288 |
| 4,040,727 | 8/1977 | Ketchpel | 350/288 |
| 4,130,037 | 12/1978 | Matthews | 83/56 |
| 4,367,665 | 1/1983 | Terpstra et al. | 83/100 |
| 4,641,556 | 2/1987 | Vigneron et al. | 83/56 |
| 4,882,565 | 11/1989 | Gallmeyer | 340/461 |
| 4,904,083 | 2/1990 | Lu et al. | 356/350 |
| 5,036,740 | 8/1991 | Tsai | 83/455 |

Primary Examiner—Eugenia Jones
Assistant Examiner—Allan M. Schrock
Attorney, Agent, or Firm—Miguel A. Valdes; Roger S. Gaither; William R. Moser

[57] ABSTRACT

An apparatus and process are disclosed for removal of a stripe of soft reflective material of uniform width from the surface of a mirror by using a blade having a large included angle to inhibit curling of the blade during the cutting operation which could result in damage to the glass substrate of the mirror. The cutting blade is maintained at a low blade angle with respect to the mirror surface to produce minimal chipping along the cut edge and to minimize the force exerted on the coating normal to the glass surface which could deform the flat mirror. The mirror is mounted in a cutting mechanism containing a movable carriage on which the blade is mounted to provide very accurate straightness of the travel of the blade along the mirror.

18 Claims, 6 Drawing Sheets

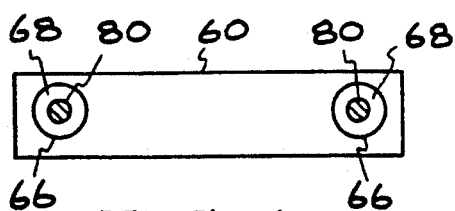
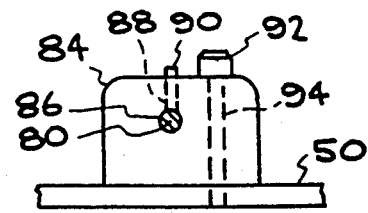
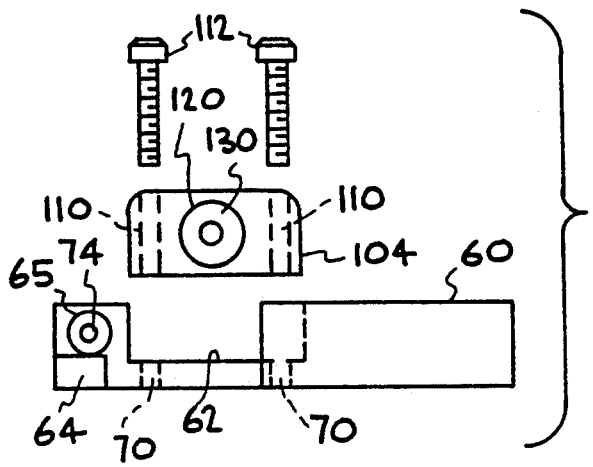
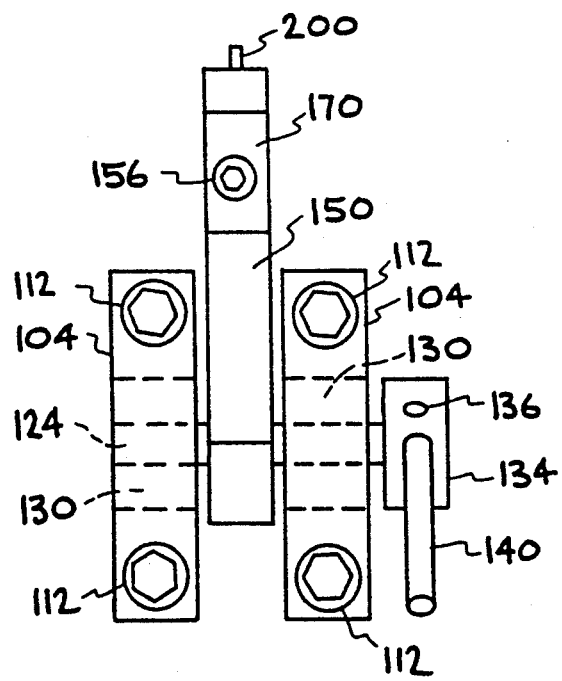
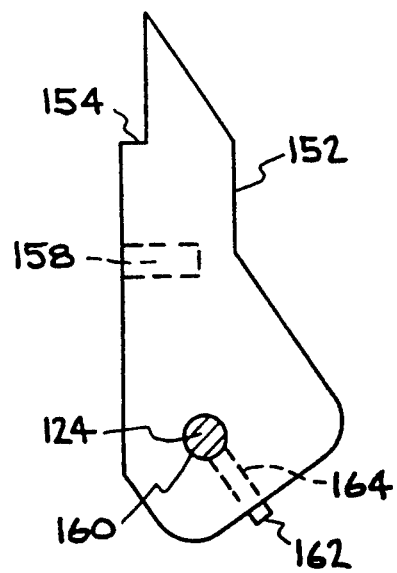
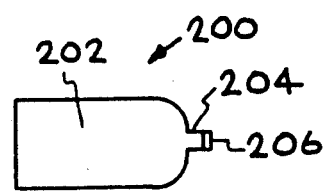

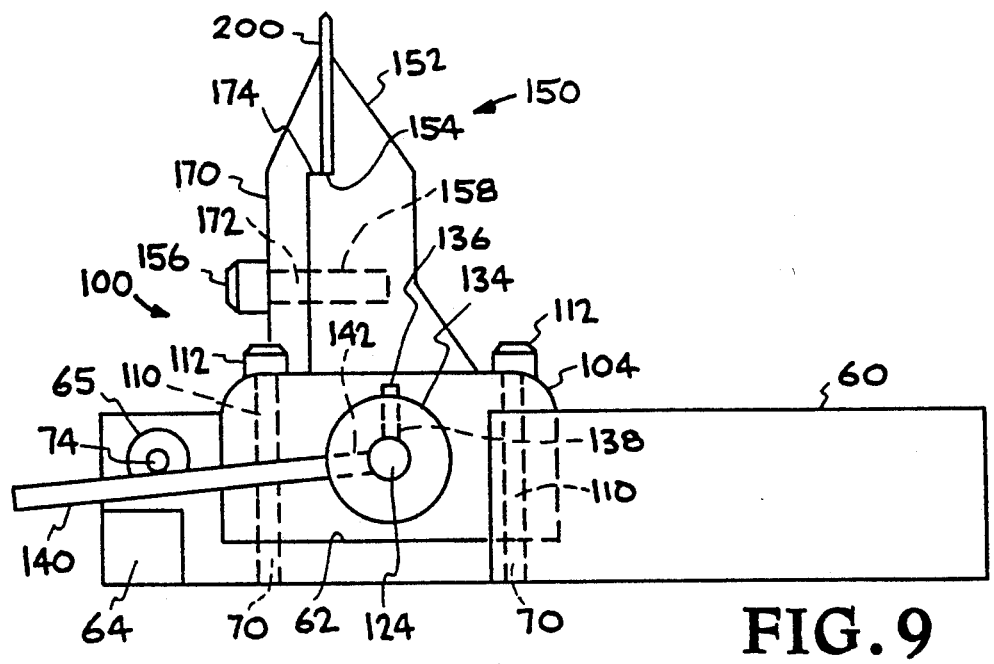
FIG. 9
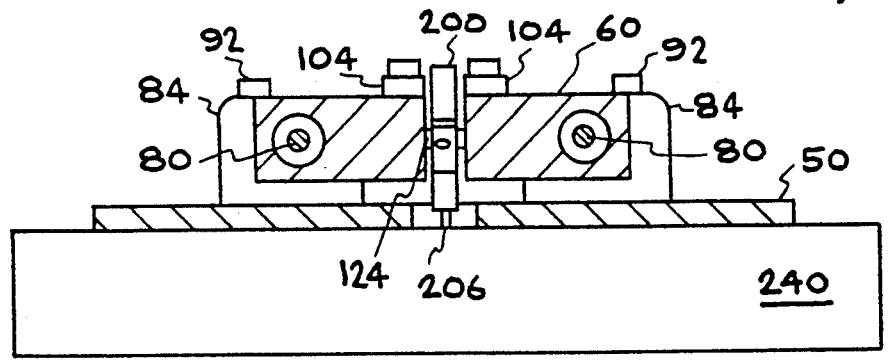
FIG. 12
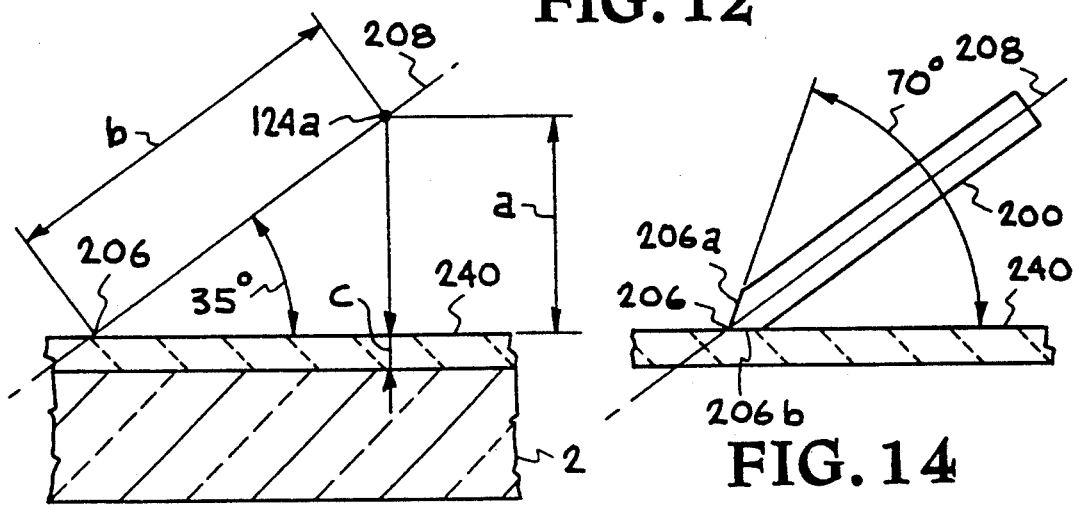
FIG. 13
FIG. 14

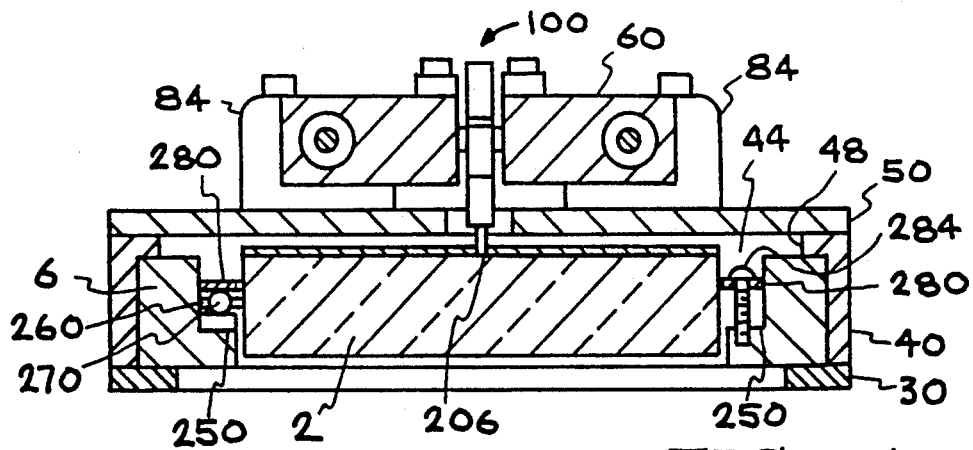
FIG. 15
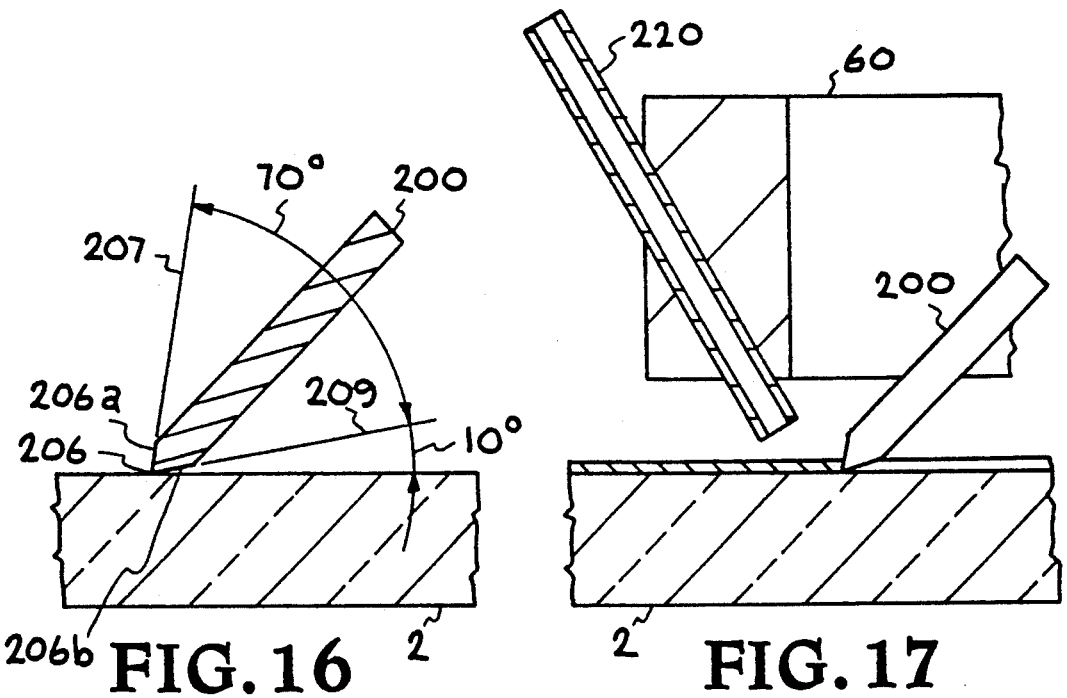
FIG. 16
FIG. 17
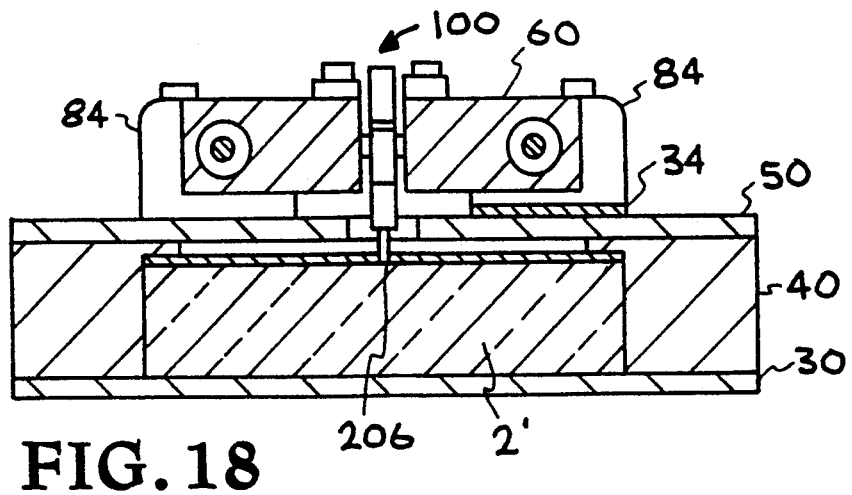
FIG. 18

APPARATUS AND PROCESS FOR REMOVING A PREDETERMINED PORTION OF REFLECTIVE MATERIAL FROM MIRROR

BACKGROUND OF THE INVENTION

The invention described herein arose in the course of, or under, Contract No. W-7405-ENG-48 between the United States Department of Energy and the University of California.

In the operation of an interferometer such as a Fabry Perot interferometer, it is known that the light output can be increased by as much as 50 times by removing a portion of reflective material from the input mirror surface in the form of a narrow stripe of, for example, ~700 micrometers width.

However, it has been found to be very difficult to accurately remove such a narrow width of reflective material in a manner which will not damage the remainder of the mirror, yet provide a stripe of uniform width with little or no residues remaining, in the stripe, from the removal of the reflective material.

For example, masking and etching techniques in common usage in the integrated circuit chip industry can form very accurate and fine lines or openings on mirrors with hard coatings of dielectric reflective materials. However the process of applying such hard coatings to mirrors induces stress and distortion into the underlying glass, resulting in degradation of the optical properties of the mirror.

Ion etching of either hard or soft dielectric reflective coatings is difficult to control, both from the standpoint of the desired anisotropy of the etch, as well as control of the depth of the etch, i.e., to remove only the reflective dielectric coating material without also etching the underlying glass.

We have, therefore, found that mechanical scoring or cutting of soft dielectric reflective material, e.g., reflective material such as a zinc sulfide/magnesium fluoride layered dielectric reflective material sensitive to light of visible wavelengths (450-650 nm), available from the Burleigh Instruments Company, is the only feasible means for forming the stripe without damaging the mirror. However, such soft dielectric material may be very easily destroyed, i.e., by merely touching the surface of the coating of soft reflective material on the glass surface.

Therefore, any mechanical removal means must be capable of performing a sharp and accurate straight edge cut without touching other parts of the coating so that the remainder of the reflective surface will not be damaged during the formation of an accurate stripe of uniform width, so that the amount of light transmitted through the clear stripe (from the backside of the mirror) will be consistent along the entire length of the stripe.

SUMMARY OF THE INVENTION

It is, therefore, an object of this invention to provide an apparatus and process for removal of a stripe of soft reflective material, of uniform and predetermined width, from the surface of a mirror which comprises using a blade having a large included angle to inhibit curling of the blade during the cutting operation which could result in damage to the glass substrate of the mirror.

It is another object of this invention to provide an apparatus and process for removal of a stripe of soft reflective material of uniform width from the surface of a mirror which comprises using a blade maintained at a low blade angle with respect to the mirror surface to produce minimal chipping along the cut edge and to minimize the force exerted on the coating normal to the glass surface which could deform the flat mirror.

It is a further object of this invention to provide an apparatus and process for removal of a stripe of soft reflective material of uniform width from the surface of a mirror which comprises providing a movable carriage on which the blade is mounted which will provide very accurate straightness of the travel of the blade along the mirror.

These and other objects of the invention will be apparent from the following description and accompanying drawings.

BRIEF DESCRIPTION OF THE DRAWINGS

FIG. 5 is an side view of the carriage in FIG. 4, taken along lines 5—5.

FIG. 6 is a side view of one of the supports for the rails on which the carriage rides shown in FIG. 4 taken along lines 6—6.

FIG. 7 is a partially exploded side view of the carriage and mounting blocks for the cutting blade mounting mechanism, showing attachment of the mounting blocks to the carriage.

FIG. 8 is a top view of the cutting blade mechanism showing the rotatable mounting of the cutting blade and cutting blade clamps in the cutting blade mechanism.

FIG. 9 is a side view of the cutting blade and the cutting blade mounting mechanism attached to the carriage via the mounting blocks.

FIG. 10 is a side view of the main arm of the cutting blade clamp mechanism.

FIG. 11 is a top view of the cutting blade.

FIG. 12 is a fragmentary vertical end view of the apparatus showing the cutting blade angled surface being formed thereon by placing the top plate of the apparatus, and the movable carriage and cutting blade mechanism thereon over a honing surface.

FIG. 13 is a diagram showing the relationship between the length of the blade and blade clamping mechanism from the tip of the blade to the pivot point on the blade clamping mechanism versus the distance of the pivot point above the honing surface to control the side surface angle being honed at the blade tip.

FIG. 14 is a fragmentary side view of the angled surface being formed on the cutting blade by honing the blade on a honing surface placed below the top mounting plate of the apparatus, illustrating formation of the large included angle of the cutting blade.

FIG. 15 is a fragmentary end view of the apparatus of the invention showing a mirror mounted therein and illustrating the cutting blade in contact with the reflective coating on the upper surface of the mirror.

FIG. 16 is a fragmentary side view of the apparatus showing the cutting blade in contact with the reflective coating on the top surface of a mirror.

FIG. 17 is a fragmentary side view of the blade in contact with the mirror, illustrating the provision of vacuum means for removal of reflective material cut from the glass surface by the blade.

FIG. 18 shows a modification of the mirror cutting apparatus shown in FIG. 15 to accommodate a wedge shaped mirror.

DETAILED DESCRIPTION OF THE INVENTION

Figure 1:
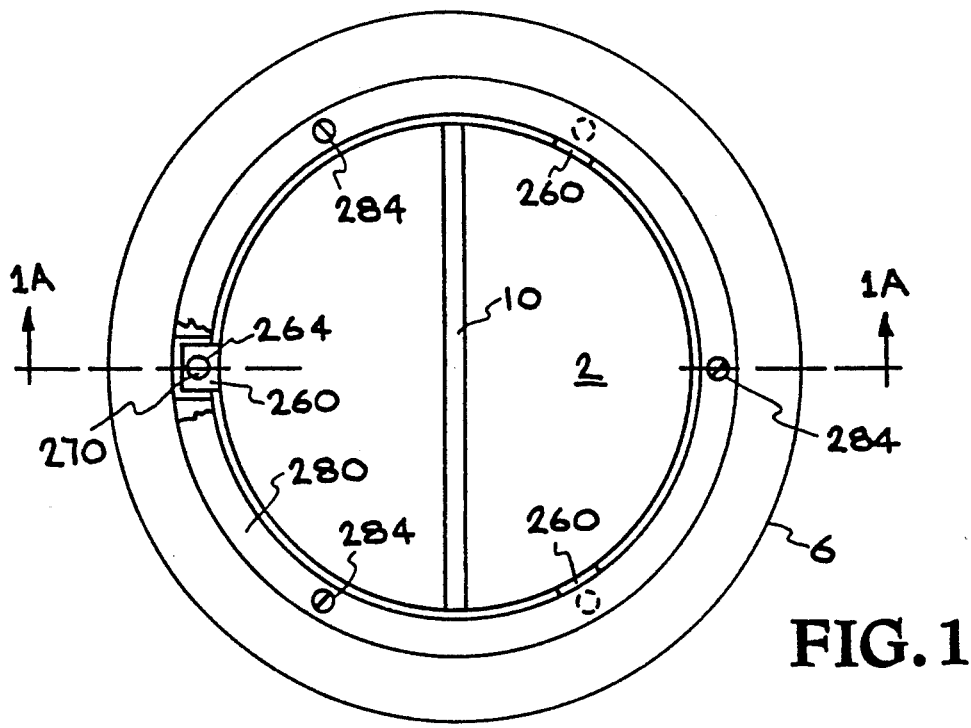
FIG. 1 is a top view of a mirror and mirror frame after a stripe of reflective material has been removed from the mirror removed by the process and apparatus of the invention.
Figure 1A:
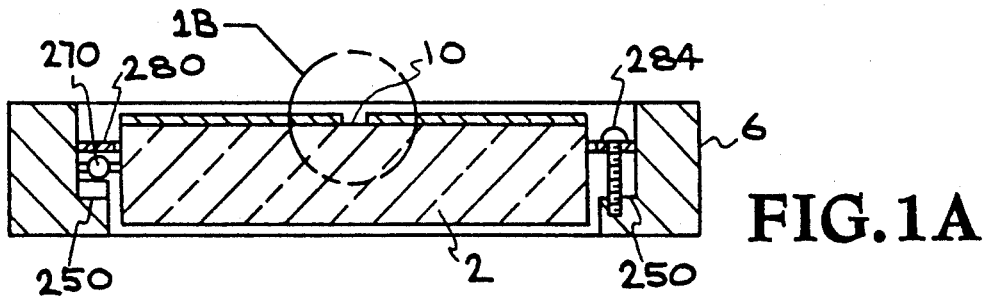
FIG. 1A is a vertical cross-sectional of the mirror and mirror frame shown in FIG. 1, taken along lines 1A—1A.
Figure 1B:
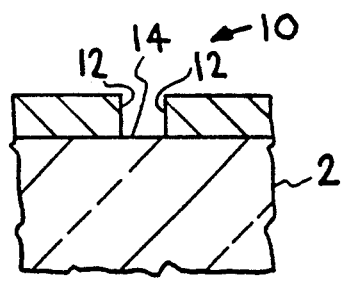
FIG. 1B is a fragmentary view of a portion of the mirror shown in FIG. 1A, illustrating the clean side edges of the stripe cut through the reflective material by the process and apparatus of the invention.

Referring now to FIGS. 1 and 1A–1C, a mirror is shown at 2 mounted in a mirror frame 6 with a stripe 10 cut mirror 6 in accordance with the invention. As shown in FIGS. 1A and 1B, sidewalls 12 of stripe 10 are vertical and straight or clean, i.e., not jagged, and bottom wall 14, comprising the top surface of the glass substrate of mirror 2, is also clean with no residues remaining after the cutting action has been completed.

Figure 1C:
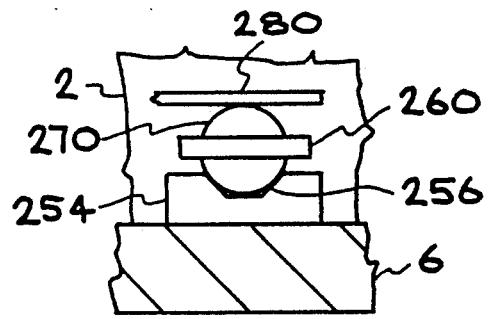
FIG. 1C is a fragmentary side section view of a portion of the mirror and mirror frame shown in FIGS. 1 and 1A, illustrating the manner in which the mirror is retained in the mirror frame.

For purposes of mounting mirror 2 therein, frame 6 is provided with a shoulder portion 250. Mirror 2 is provided with three tabs 260 which may be glued to mirror 2. Each tab 260 contains a ball 270 in an opening 264 which rests on a support block 254 mounted on shoulder portion 250 of frame 6, as seen in FIGS. 1A and 1C. Each ball 270 rests in a generally v-shaped groove 256 formed on the upper surface of support block 254. The balls 270 are secured against the v-shaped grooves 256 by a retainer ring 280 which bears against the opposite side of each ball. Retainer ring 280 is secured to shoulder 250 of frame 6 by screws 284.

Figure 2:
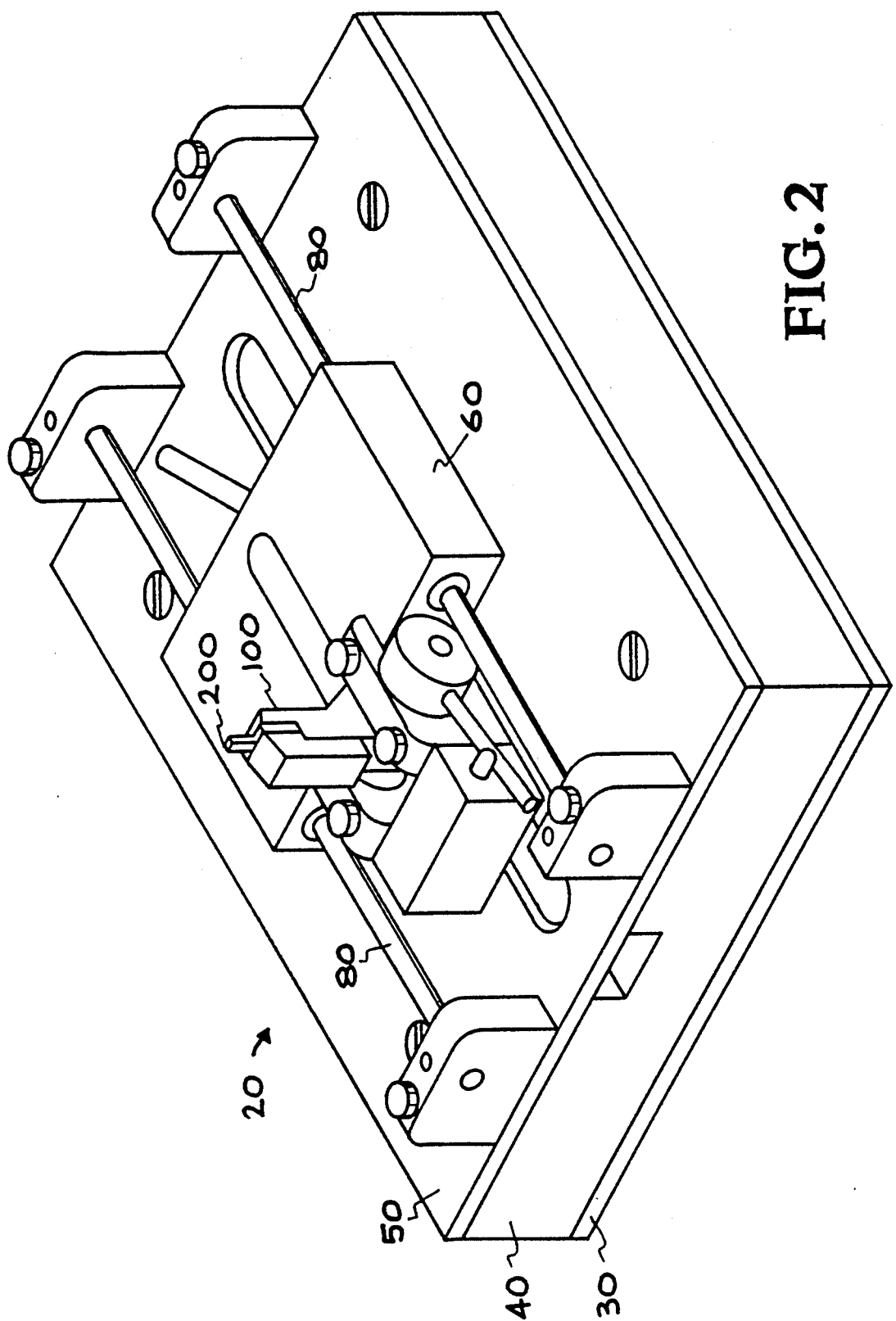
FIG. 2 is an isometric view of the cutting apparatus of the invention.

FIG. 2 generally indicates at 20 the apparatus of the invention used to cut strip 10 in mirror 2. Cutting apparatus 20, which will be described in more detail below, generally comprises a base plate 30, a main body section 40, a top plate 50, a movable carriage 60 mounted on a pair of rails 80 on top plate 50, a cutting mechanism 100 mounted to movable carriage 60, and a cutting blade 200 secured in cutting mechanism 100.

Figure 3:
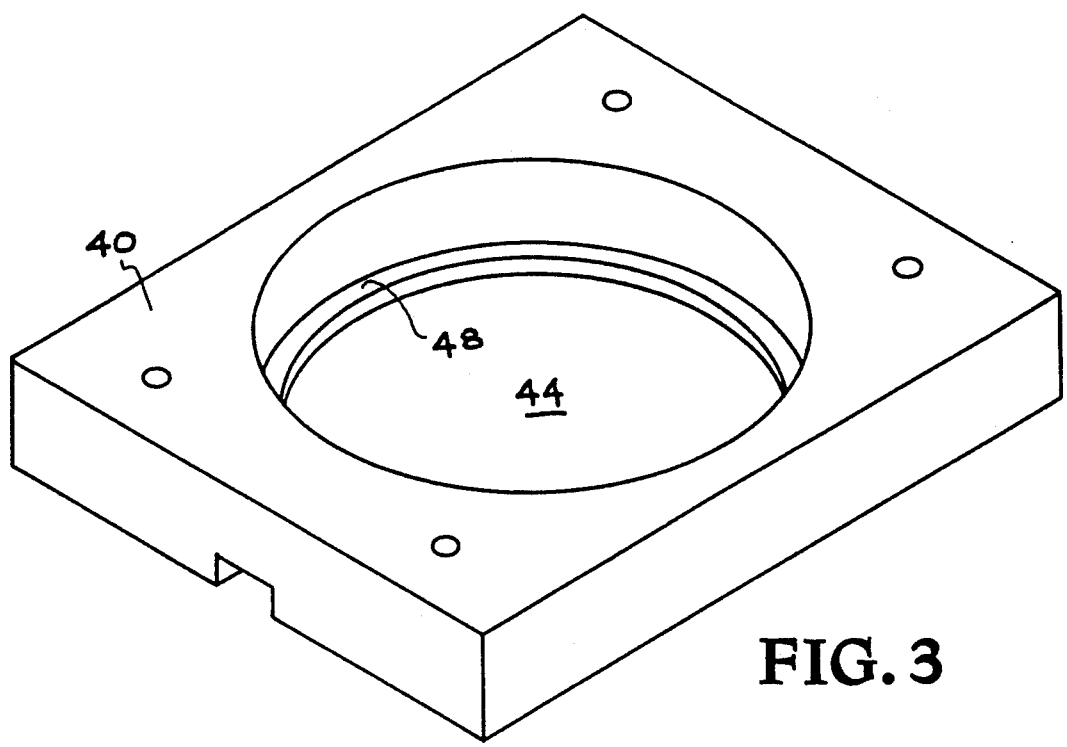
FIG. 3 is an isometric view of the main body of the cutting apparatus, taken from the bottom, showing the opening used to receive the mirror and mirror frame, and the spacing lip to space the front surface of the mirror from the top plate of the cutting operation.

As shown in FIG. 3, main body section 40 is provided with a circular cavity 44 having the same diameter as frame 6 in which mirror 2 is mounted. Mirror 2 is provided with a frame 6 which fits into circular cavity 44. The depth of circular cavity 44 is slightly less than the thickness of frame 6 so that when base plate 30 is installed, as will be described below, frame 6 is clamped therein. This method of retention allows frame 6 to be positioned in any rotational orientation to accommodate any interferometer into which frame 6 and mirror 2 (with stripe 10 cut thereon) will subsequently be mounted. A reference mark may be placed on the mirror holder and a corresponding marking may be placed on the cutting apparatus adjacent cavity 44 to provide alignment therebetween. An inward lip 48 is provided to space the front surface of mirror 2 from the cutting blade, as will be described below.

Figure 4:
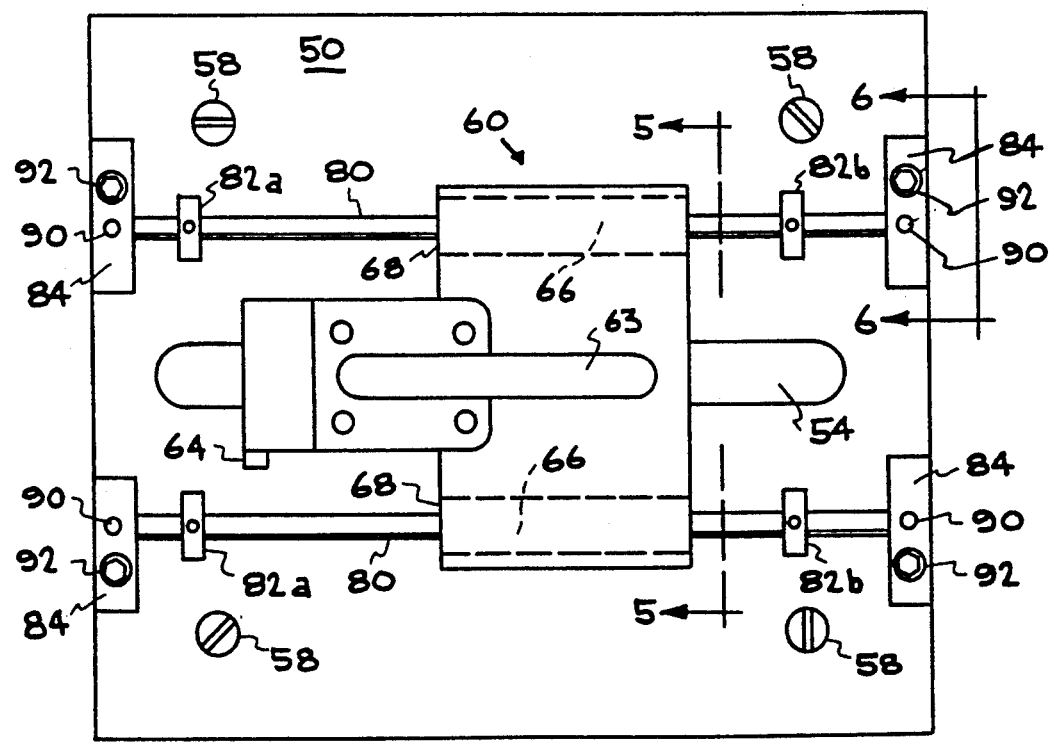
FIG. 4 is a top view of a portion of the cutting apparatus showing the traveling carriage and the rails on which it rides.

Referring now to FIGS. 4–6, top plate 50 comprises a rectangular metal plate having a long central slot 54 formed therein to permit access to the surface of the mirror which will be mounted below top plate 50 in main body section 40 and secured therein by bottom plate 30. Top plate 50 may be secured to main body section 40 by bolts 58, as shown in FIG. 4.

Mounted respectively adjacent to the four corners of the upper surface of top plate 50 are four rail supports 84, as seen in FIGS. 4 and 6. Each rail support 84 has a horizontal bore 86 formed therein to receive one of the rails 80 therein. A threaded vertical bore 88, extending downwardly from the top surface of rail support 84, intersects horizontal bore 86 and contains a set screw 90 used to firmly secure rail 80 in bore 86. A bolt 92 received in a vertical bore 94 in each rail support 84 secures rail support 84 to top plate 50. Each rail 80 is then secured, at its opposite ends, in the respective bores 86 of rail supports 84.

Mounted on rails 80 is a movable carriage 60 having a pair of parallel bores 66 in which are respectively press fitted ball bushings 68, such as the Instrument Series ball bushing available from the Thompson Company, through which rails 80 respectively pass. Such ball bushings 68, which are furnished as a unit with rails 80, provide for a very accurate linear travel of carriage 60 along rails 80, with substantially no horizontal or vertical play so that carriage 60 will travel in a path exactly parallel to the axis of slot 54 and in a plane exactly parallel to the surface of top plate 50. Carriage 60 is provided with an elongated central slot 63, smaller in both width and length than slot 54 in top plate 50, but having its major axis in alignment with the major axis of slot 54 as seen in FIG. 4. Slot 63 permits the cutting mechanism 100, to be described below, to have access to the mirror through slot 54 in underlying top plate 50.

Stops 82 mounted on opposite ends of one or both rails 80 limit the extent of horizontal travel of carriage 60 along rails 80 to facilitate accurate positioning of the cutting means with respect to the edges of mirror 2, as will be described below.

Referring now to FIGS. 7–11, cutting mechanism 100 comprises a pair of mounting blocks 104 which are mounted upon a cutaway portion 62 of carriage 60 via bolts 112 received in vertical bores 110 in each mounting block 104 and which are threadedly received in threaded bores 70 in cutaway portion 62 of carriage 60.

Each mounting block 104 has formed therein a horizontal bore 120 to receive a ball bearing race 130 press fit therein, as shown in FIG. 9, on which a shaft 124 will ride to permit free turning of shaft 124 with respect to mounting blocks 104. A small pulley 134 may also be mounted on shaft 124 and secured thereto by a set screw 136 received in a threaded bore 138 which intersects the central opening in pulley 134. A handle 140 is mounted in a bore 142 in pulley 134 to permit control of rotation of shaft 124 via handle 140.

Mounted to shaft 124 between mounting blocks 104 is a two piece cutting blade clamp assembly 150 comprising a main arm 152 and a clamp 170. Main arm 152 is formed with a shoulder portion 154 which mates with an overhanging portion 174 of clamp 170. Shoulder 154 forms a stop for cutting blade 200 which is inserted between main arm 152 and clamp 170. A bolt 156 passes through a bore 172 in clamp 170 and is received in a threaded bore 158 in main arm 152 to secure clamp 170 to main arm 152 as well as to secure cutting blade 200 therebetween.

Shaft 124 passes through a bore 160 in main arm 152 of cutting blade clamp assembly 150 and main arm 152 is secured to shaft 124 via a set screw 162 provided in a threaded bore 164 in arm 152 which intersects bore 160.

Thus with cutting blade 200 clamped to main arm 152 and clamp 170 via bolt 156, and cutting assembly 150 attached to shaft 124 via set screw 162, rotation of handle 140 on pulley 134 rotates shaft 124 which, in turn, rotates cutting blade clamp assembly 150 which rotates cutting blade 200 to permit rotation of cutting blade 200 down into engagement with the reflective material on the surface of mirror 2, or up out of engagement with the surface of mirror 2. As shown in FIGS. 2, 4, 7, and 9 a stop 64 may be formed on the side of carriage 60 which cooperates with a spring-loaded ball detente 74 mounted in a horizontal bore 65 in carriage 60 to releasably engage handle 140 to thereby secure blade 200 in an upward position out of engagement with the surface of mirror 2 when cutting blade 200 is not in use.

FIG. 11 illustrates cutting blade 200, which is formed from a high grade cutting steel such as, for example razor knife blade, and comprises a main portion 202 and a narrow portion 204 culminating in a chisel point 206. Chisel point 206, in turn, comprises two side surfaces 206a and 206b which define a large included angle therebetween of about 60° to about 80°, preferably about 65° to about 75°, and most preferably about 70°±2°, as best seen in FIGS. 14 and 16. The large included angle may be formed on blade 200 in an independent jig. Preferably, however, the angle is formed on blade 200 in situ in the following manner.

Top plate 50 is normally secured to main body section 40 which, together with base plate 30, holds mirror 2 a fixed distance from top plate 50 and the cutting blade mechanism 100 mounted thereon through rails 80 and movable carriage 60.

However, to form the large included angle on blade 200, top plate 50, together with everything secured to the top surface thereof, is removed from main body section 40 and placed over the surface of a honing block 240 such as a glass honing block, as shown in FIG. 12, having a grinding material such as diamond paste on the surface of honing block 240. Blade 200 is carefully lowered onto the surface of block 240, by rotation of shaft 124 using handle 140, and once contact is made, the blade is pushed over the surface of block 240 by moving carriage 60 on rails 80 to form side surface 206a at the point 206 of blade 200. The lapping is done using successively finer grades of grinding materials such as diamond paste progressing from 3.0 micron to 1.0 micron and finishing with 0.5 micron.

By designing the length of cutting blade mechanism 100, from center axis 124a of shaft 124 to the point 206 of blade 200 to be a fixed distance "b" and the distance between center axis 124a of shaft 124 to the surface of honing block 240 a second fixed distance "a1", as shown in FIG. 13, the relative lengths "a" and "b" may be adjusted to provide for formation of side surface 206a at an angle of 35° from the center axis 208 of blade 200 to the surface of honing block 240 during the honing operation to obtained the preferred 70° included angle on blade 200.

By reversing blade 200 in cutting blade clamping mechanism 100, after side surface 206a is formed at a 35° angle between center axis 208 and surface 240, side surface 206b may also be formed in the same manner at a 35° angle between center axis 208 and honing surface 240 to obtain the preferred 70° included angle defined between side surfaces 206a and 206b of end point 206 on cutting blade 200 as shown in FIGS. 14 and 16 between lines 207 and 209, representing extensions of the surfaces of 206a and 206b for illustrative purposes only.

After forming the desired preferred included angle on tip 206 of blade 200, top plate 50 is reassembled to main body portion 40 and mirror 2 is then inserted into cavity 44 in body portion 40, following which bottom plate 30 is attached to main body 40 to secure mirror 2 in place in cutting apparatus 20.

As seen in FIGS. 3 and 15, cavity 44 of main body portion 40 is formed with an inward lip 48 of predetermined thickness to space the top surface of mirror 2 a distance "c" from the bottom surface of top plate 50, as graphically portrayed in FIG. 13. Since the top surface of mirror 2 will, therefore, be at a different spacing from blade 200 than was honing surface 240, a small angle will be formed between side surface 206b of blade tip 206 and the surface of mirror 2, as shown in FIG. 16 (between line 209—representing an extension of surface 206b—and the surface of mirror 2). The size of this angle, which comprises the blade angle of approach for cutting the stripe through the mirror coating material, will be controlled by the thickness of inward lip 48 on body portion 40. In accordance with the invention, this angle will be small, i.e., less than about 15°, and preferably about 10°, to minimize the force exerted normal to the glass surface which might tend to distort the flat mirror.

To cut the stripe 10 in the mirror coating, carriage 60 is first moved to one end of rails 80, in a direction opposite to the direction in which blade 200 will point when lowered to the mirror surface, until carriage 60 contacts stop 82a. Blade 200 is then rotated down into contact with the mirror surface and while exerting a gentle downward force, carriage 60 and blade 200 are slowly moved across the entire diameter of mirror 2 to cut the desired stripe 10 thereon until carriage 60 reaches stop 82b. Blade 200 is then rotated back out of contact with mirror 2. As used herein, the term "gentle downward force" may be defined as a force ranging from about 5 to about 100 grams and the term "slowly moved" may be defined as a movement of the carriage at from about 5 to about 50 inches/minute.

The stripe 10 cut in the reflective coating on the surface of mirror 2, as shown in FIGS. 1 and 1A, is a clean and sharp cut leaving no jagged edges. However, it has been noted that some residues of the reflective coating material sometimes remain in the stripe area or on the reflective coating adjacent the cut stripe which is obviously undesirable.

Therefore, in accordance with one embodiment of the invention, the cutting apparatus is further provided with a vacuum tube 220, as shown in FIG. 17, which may be slidably mounted just ahead of blade 200 to remove such residues as they are formed during the cutting step. By sliding tube 220 down to the position shown in FIG. 17, tube 220 may also be used to clean blade 200 by stopping the movement of carriage 60 and rotating blade 200 up into contact with tube 220, i.e., to lightly tap tube 20 with blade 200, to physically loosen any residues of reflective material which may be clinging to blade 200.

Turning now to FIG. 18, a modification of the mirror mounting structure of FIG. 15 is shown which accommodates a wedge shaped mirror 2'. In this embodiment shims 34 (which are greatly exaggerated for illustrative purposes) are respectively placed between top plate 50 and the two rail supports 84 for one of the rails 80 to slightly tilt carriage 60, with respect to top plate 50 and the front surface of mirror 2' so that the front surface of mirror 2' will still be parallel to carriage 60, i.e., the cutting mechanism mounted to carriage 60 will see the identical parallel, but spaced apart, top surface of the mirror as normally seen in a flat mirror without the shims. Different thicknesses of shims 34 may be fabricated to accommodate variously dimensioned wedge shaped mirrors.

Figure 19:
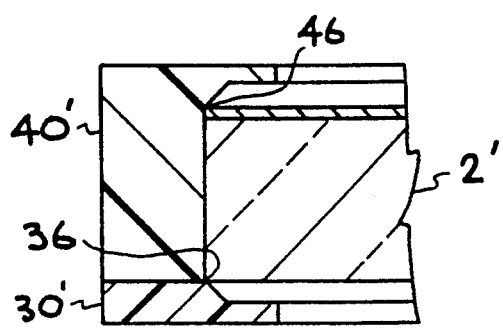
FIG. 19 is a fragmentary side section view of another embodiment of the mirror frame designed to accommodate mirrors of varying sizes.

In FIG. 19, yet another embodiment is shown for use when no mirror frame is present. In this embodiment, a mirror 2' is secured in the apparatus by providing a beveled edge or corner 46 in main body section 40' and a similar dimensioned beveled edge or corner 36 in base plate 30'.

Thus the process and apparatus of the invention permit the accurate formation of a stripe of uniform width across the face of a mirror without damage to the remainder of the reflective coating thereon. While specific embodiments of the process and apparatus have been illustrated and described for carrying out the process in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. A process for accurately removing a stripe of reflective material from a planar surface of a mirror, said apparatus comprising:
   a) mounting a cutting blade in a cutting mechanism with a cutting edge of said cutting blade disposed transverse to the longitudinal length of said stripe to be cut in said reflective material on said planar surface of said mirror;
   b) forming an included angle on an end of said cutting blade of from about 60° to about 80° by placing said cutting mechanism over a homing surface mounted a first distance from said blade;
   c) mounting a mirror in a mirror holding mechanism
   d) mounting said cutting mechanism over said mirror holding mechanism to space said blade from said mirror surface a second distance greater than said first distance, whereby said mirror surface will form an angle of less than about 15° with one side of the included angle of said blade;
   e) moving said cutting blade over said mirror surface in a direction parallel to said planar surface of said mirror to cut said stripe in said reflective material on said planar surface of said mirror.

2. The process of claim 1 in which the step of mounting said mirror further includes rotationally orienting said mirror in said mirror holding mechanism to thereby orient said cutting blade to said mirror to thereby cut said stripe at a selected location on said surface of said mirror.

3. The process of claim 2 which further comprises providing a shim beneath said mirror in said mirror holding mechanism when opposite surfaces of said mirror are not parallel whereby said surface of said mirror containing said reflective material and facing said cutting mechanism will be in a plane parallel to the second surface of said top plate.

4. The process of claim 1 wherein said step of moving said cutting blade over said mirror surface in a direction parallel to said plane of said mirror to cut said stripe in said reflective material on said planar surface of said mirror further comprises exerting a downward force of from about 5 to about 100 grams against said reflective material and said mirror during said cutting.

5. The process of claim 1 wherein said step of moving said cutting blade over said mirror surface in a direction parallel to said plane of said mirror to cut said stripe in said reflective material on said planar surface of said mirror further comprises moving said cutting blade across said reflective material at a speed of from about 5 to about 50 inches per minute.

6. Apparatus for accurately cutting a stripe in a reflective coating on the surface of a mirror, said apparatus comprising:
   a) mirror holding means capable of receiving a mirror and maintaining a mirror surface having a reflective coating thereon in a plane parallel to a first surface on said mirror holding means;
   b) a top plate having first and second spaced apart parallel surfaces, said first surface of said top plate being mounted to said first surface of said mirror holding means to form a substantially enclosed housing;
   c) rail mounting means on said second surface of said top plate for mounting a pair of rails parallel to one another and in a plane parallel to and spaced from said second surface of said top plate;
   d) a movable carriage mounted on said rails to move over said second surface of said top plate in a plane parallel to said second surface and in a direction parallel to the axes of said parallel rails, said movable carriage provided with spaced apart ball bushings at opposite ends of said carriage to receive said rails, whereby the travel of said carriage along said rails is maintained in a direction parallel to the plane defined by said parallel rails and parallel to the plane of said reflective coating on said surface of said mirror to thereby permit accurate cutting of a straight stripe of said reflective coating from the surface of said mirror;
   e) rotatable cutting blade retaining means on said carriage capable of rotating in a plane normal to the second surface of said top plate and parallel to the axes of said rails;
   f) a cutting blade mounted on said rotatable cutting blade retaining means and having a cutting edge thereon disposed transverse to the longitudinal length of the stripe to be cut in said reflective coating and an included angle at the tip of said blade of from about 60° to about 80°; and
   g) means for rotating said rotatable cutting blade retaining means and said cutting blade mounted thereon into engagement with said reflective coating on said mirror in said mirror holding means at a fixed angle between said plane of said reflective coating and a side tip surface of said cutting blade of less than about 15°;

whereby movement of said carriage along said rails while said cutting blade is in contact with said reflective coating results in a stripe being accurately cut in said reflective coating equal to the width of said cutting blade.

7. The apparatus of claim 6 wherein said mirror holding means further include means for rotationally orienting said mirror in said mirror holding means while maintaining said mirror surface having said reflective coating thereon in a plane parallel to said first surface on said mirror holding means.

8. The apparatus of claim 6 wherein said top plate is formed with a central slot extending from said first surface to said second surface of said top plate, said slot having a major axis parallel to said rails on said top plate, and having a length sufficient to permit said cutting blade to communicate with said reflective coating on said mirror surface from one edge of said mirror to the opposite edge as said carriage is moved over said slot.

9. The apparatus of claim 8 wherein at least one of said rails is provided with stop means thereon to limit the travel of said movable carriage along said rails.

10. The apparatus of claim 6 wherein said rotatable cutting blade retaining means mounted on said carriage further comprise:
a) a pair of parallel spaced apart mounting blocks secured to said movable carriage on opposite sides of said slot;
b) a rotatable shaft rotatably received adjacent opposite ends thereof in ball bearings mounted in respective bores in said mounting blocks normal to said major axis of said slot so that said shaft is disposed parallel to said plane defined by said rails and capable of rotating in a plane normal to said plane defined by said parallel rails;
c) cutting blade clamping means nonrotatably mounted on said shaft between said pair of mounting blocks having said cutting blade clamped thereto, so that rotation of said shaft and said cutting blade clamping means thereon toward said second surface of said top plate will rotate said cutting blade through said slot toward said reflective coating on said mirror.

11. The apparatus of claim 10 wherein the included angle of said cutting blade from the center axis of said cutting blade to the side tip surface facing said reflective coating ranges from about 32.5° to about 37.5°.

12. The apparatus of claim 10 wherein the distance from the tip of said cutting blade to a pivot point where said cutting blade clamping means is nonrotatably mounted on said shaft, and the distance between said pivot point and said reflecting coating on said mirror surface, are each fixed to provide an angle between the plane of said reflective coating and the center axis of said cutting blade of from about 37.5° to about 42.5°.

13. The apparatus of claim 10 wherein the included angle at the tip of said blade is about 70° and the angle between the plane of said reflective coating and the tip surface of said cutting blade facing said reflective coating is about 10°.

14. The apparatus of claim 6 wherein said included angle ranges from about 65° to about 75°.

15. The apparatus of claim 1 wherein said included angle is about 70°.

16. The apparatus of claim 6 which further includes means for maintaining said reflective surface on said mirror parallel to said second surface of said top plate when said mirror is formed of glass of nonuniform thickness.

17. The apparatus of claim 6 which further includes vacuum means on said carriage for removing residues remaining from said cutting of said stripe of reflective coating by said cutting blade.

18. Apparatus for accurately cutting a stripe in a reflective coating on the surface of a mirror, said apparatus comprising:
a) mirror holding means capable of receiving a mirror and maintaining a reflective coating surface thereon in a plane parallel to a first surface on said mirror holding means;
b) a top plate having first and second spaced apart parallel surfaces, said first surface of said top plate being mounted to said first surface of said mirror holding means, to form a substantially enclosed housing;
c) rail mounting means on said second surface of said top plate for mounting a pair of rails parallel to one another and in a plane parallel to and spaced from said second surface of said top plate;
d) a movable carriage mounted on said rails to move over said second surface in a plane parallel to said second surface of said top plate and in a direction parallel to the axes of said parallel rails;
e) a central slot in said top plate extending from said first surface to said second surface of said top plate, said slot having a major axis parallel to said rails on said top plate, and having a length sufficient to permit a cutting blade to communicate with said reflective coating on said mirror surface from one edge of said mirror to the opposite edge as said carriage is moved over said slot;
f) a cutting blade having an inclined angle at the tip thereof from about 65° to 75°, said cutting blade being mounted on rotatable cutting blade means and having a cutting edge thereon disposed transverse to the longitudinal length of a stripe to be cut in said reflective coating;
g) said rotatable cutting blade retaining means mounted on said carriage and capable of rotating in a plane normal to the second surface of said top plate and parallel to the axes of said rails comprising:
i) a pair of parallel spaced apart mounting blocks secured to said movable carriage on opposite sides of said slot;
ii) a rotatable shaft rotatably received adjacent opposite ends thereof in ball bearing races in respective bores in said mounting blocks normal to said major axis of said slot so that said shaft is disposed parallel to said plane defined by said rails and capable of rotating in a plane normal to said plane defined by said parallel rails;
iii) cutting blade clamping means nonrotatably mounted on said shaft between said pair of mounting blocks, and having said cutting blade clamped thereto, so that rotation of said shaft and said cutting blade clamping means thereon toward said second surface of said top plate rotates said cutting blade through said slot toward said reflective coating on said mirror;
h) means for rotating said rotatable cutting blade retaining means and said cutting blade mounted thereon into engagement with said reflective coating on said mirror in said mirror holding means at an angle of less than about 15° between the plane of said reflective coating surface and the surface of said cutting blade facing said reflective coating;

i) spaced apart ball bushings at opposite ends of said carriage to receive said rails, to provide for accurate travel of said carriage along said rails in a direction exactly parallel to the plane defined by said parallel rails and parallel to said major axis of said slot to thereby maintain said cutting edge of said blade accurately in a plane parallel to said plane of said reflective coating on said mirror to thereby cut a straight stripe of said reflective material from the surface of said mirror;

whereby movement of said carriage along said rails while said cutting blade is in contact with said reflective coating results in a stripe being accurately cut in said reflective coating equal to the width of said cutting blade.

* * * * *